United States Patent
Storey et al.

(10) Patent No.: US 10,614,541 B2
(45) Date of Patent: Apr. 7, 2020

(54) HYBRID, SCALABLE CPU/GPU RIGID BODY PIPELINE

(71) Applicant: NVIDIA CORPORATION, Santa Clara, CA (US)

(72) Inventors: Kier Storey, Santa Clara, CA (US); Fengyun Lu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1 day.

(21) Appl. No.: 15/636,973

(22) Filed: Jun. 29, 2017

(65) Prior Publication Data
US 2019/0005602 A1 Jan. 3, 2019

(51) Int. Cl.

| | |
|---|---|
| *G06T 1/20* | (2006.01) |
| *A63F 13/52* | (2014.01) |
| *A63F 13/56* | (2014.01) |
| *A63F 13/25* | (2014.01) |
| *G09G 5/36* | (2006.01) |
| *G06F 3/14* | (2006.01) |

(52) U.S. Cl.
CPC ............... *G06T 1/20* (2013.01); *A63F 13/25* (2014.09); *A63F 13/52* (2014.09); *A63F 13/56* (2014.09); *G09G 5/363* (2013.01); *A63F 2300/203* (2013.01); *G06F 3/14* (2013.01); *G09G 2352/00* (2013.01); *G09G 2360/08* (2013.01)

(58) Field of Classification Search
CPC ...... G06F 17/5009; G06F 9/4843; G06F 9/52; G06T 1/20; G06T 13/00; G06T 15/005; G06T 19/00
See application file for complete search history.

(56) References Cited

U.S. PATENT DOCUMENTS

| 7,965,289 B1 | 6/2011 | Green et al. |
| 8,217,951 B2 | 7/2012 | Jung |

(Continued)

FOREIGN PATENT DOCUMENTS

| CN | 102523054 A | 6/2012 |
| CN | 103279330 A | 9/2013 |

(Continued)

OTHER PUBLICATIONS

Ricardo et al.("Fluid simulation with two-way interaction rigid body using a heterogeneous GPU and CPU environment", 2010 Brazilian Symposium on Games and Digital Entertainment, obtained from IEEE Xplore (Year: 2010).*

(Continued)

*Primary Examiner* — Hau H Nguyen
(74) *Attorney, Agent, or Firm* — Shook Hary & Bacon, L.L.P.

(57) ABSTRACT

A method for implementing a hybrid scalable CPU/GPU rigid body pipeline. The method includes partitioning a rigid body pipeline into a GPU portion comprising GPU components and a CPU portion comprising CPU components. The method further includes executing the GPU components on the GPU of a computer system, and executing the CPU components on the CPU of the computer system. Communication data dependencies between the CPU and the GPU are managed as the GPU components and the CPU components process through the GPU and the CPU. The method concludes by outputting a resulting processed frame for display.

20 Claims, 6 Drawing Sheets

(56) References Cited

U.S. PATENT DOCUMENTS

| | | |
|---|---|---|
| 8,542,745 B2 | 9/2013 | Zhang et al. |
| 8,854,387 B2 | 10/2014 | Chung |
| 9,129,394 B2 | 9/2015 | Ungureanu et al. |
| 9,430,807 B2 | 8/2016 | Bourd et al. |
| 2006/0106591 A1 | 5/2006 | Bordes et al. |
| 2007/0067517 A1 | 3/2007 | Kuo |
| 2011/0054872 A1 | 3/2011 | Chen et al. |

FOREIGN PATENT DOCUMENTS

| | | |
|---|---|---|
| CN | 103297777 A | 9/2013 |
| CN | 103902387 A | 7/2014 |
| CN | 104102546 A | 10/2014 |
| CN | 104965761 A | 10/2015 |
| CN | 105069015 A | 11/2015 |
| CN | 105320630 A | 2/2016 |

OTHER PUBLICATIONS

Joselli et al. ("An Adaptative Game Loop Architecture with Automatic Distribution of Tasks between CPU and GPU", ACM Computers in Entertainment, vol. 7, No. 4, Article 50, Publication date: Dec. 2009, obtained from ACM digital library (Year: 2009).*

Mokhtari et al. ("Big Kernel—High Performance CPU-GPU Communication Pipelining for Big Data-style Applications", 2014 IEEE 28th International Parallel & Distributed Processing Symposium, obtained from IEEE Xplore (Year: 2014).*

"Automatic Dynamic Task Distribution between CPU and GPU for Real-Time Systems" Mark Joselli et al., retrieved from IEEE (Year: 2008).*

Hermann, Everton, Bruno Raffin, François Faure, Thierry Gautier, and Jérémie Allard. "Multi-GPU and multi-CPU parallelization for interactive physics simulations." In European Conference on Parallel Processing, pp. 235-246. Springer, Berlin, Heidelberg, 2010.

\* cited by examiner

300

301
Partitioning a rigid body pipeline into a GPU portion comprising GPU components and a CPU portion comprising CPU components

302
Executing the GPU components on the GPU of a computer system

303
Executing the CPU components on the CPU of the computer system

304
Managing communication data dependencies between the CPU and the GPU as the GPU components and the CPU components process through the GPU and the CPU

305
Outputting a resulting processed frame for display

FIG. 3

HYBRID, SCALABLE CPU/GPU RIGID BODY PIPELINE

FIELD OF THE INVENTION

The present invention is generally related to computer systems.

BACKGROUND OF THE INVENTION

PhysX is a scalable multi-platform game physics solution supporting a wide range of devices, from smartphones to high-end multicore CPUs and GPUs. PhysX is integrated into many popular game engines, including Unreal Engine (versions 3 and 4), Unity3D, and Stingray for instance. PhysX also enables simulation-driven effects like clothing, destruction and particles. Accordingly, it is advantageous to have realistic PhyX real-time effects in game applications and such. Such applications often use what is referred to as a PhyX rigid body pipeline.

High frame rates are very important for realistic interactive real-time effects in game applications and such. For example, exceeding 60 frames per second is considered the ideal for interactive simulations. To achieve these frame rates, the PhyX pipelines have to be very effectively implemented and run on very powerful hardware. This is often not possible with mobile devices (e.g., tablets, cell phones, etc.). Thus what is needed is a way to accelerate the execution of the PhyX pipelines. What is needed is a way to ensure the high frame rates that users desire.

SUMMARY OF THE INVENTION

Embodiments of the present invention implement a scalable hybrid CPU/GPU rigid body pipeline. In one embodiment, the present invention is implemented as a method for a hybrid scalable CPU/GPU rigid body pipeline. The method includes partitioning a rigid body pipeline into a GPU portion comprising GPU components and a CPU portion comprising CPU components. The method further includes executing the GPU components on the GPU of a computer system, and executing the CPU components on the CPU of the computer system. Communication of data dependencies between the CPU and the GPU are managed as the GPU components and the CPU components process through the GPU and the CPU. The method concludes by outputting a resulting processed frame for display.

In one embodiment, the present invention is admitted as a non-transitory computer readable media comprising instructions for implementing a hybrid scalable CPU/GPU rigid body pipeline, which instructions when executed by a computer system causes the computer system to implement a method. The method includes partitioning the rigid body pipeline into a GPU portion comprising GPU components operable on a GPU and a CPU portion comprising CPU components operable on a CPU. The method further includes executing the GPU components on the GPU of the computer system and executing the CPU components on the CPU of the computer system. The method further includes managing communication of data dependencies between the CPU and the GPU as the GPU components and the CPU components process through the GPU and the CPU, and outputting a resulting processed frame for display.

In one embodiment the present invention is implemented as a computer system. The computer system includes a CPU and a GPU coupled to a computer readable storage media and executing computer readable code which causes the computer system to implement a method for a hybrid scalable CPU/GPU rigid body pipeline. The method includes partitioning a rigid body pipeline into a GPU portion comprising GPU components and operable on the GPU and a CPU portion comprising CPU components and operable on the CPU. The method further includes executing the GPU components on the GPU of a computer system, and executing the CPU components on the CPU of the computer system. The method further includes managing communication of data dependencies between the CPU and the GPU as the GPU components and the CPU components process through the GPU and the CPU, and outputting a resulting processed frame for display.

Embodiments of the invention implement a hybrid CPU/GPU rigid body pipeline that executes elements of the rigid body pipeline on CPU and GPU. This approach achieves high-levels of scalability by leveraging the GPU to do the heavy-lifting of the massively-parallel work while the CPU handles all the stages that do not parallelize effectively. In one embodiment, the broad phase, narrow phase, solver and elements of shape and body state management are run on the GPU, while island generation, pair filtering, triggering, modifiable contacts, scene query update and event notification are run on the CPU.

This new hybrid CPU/GPU pipeline effectively decouples dependent computations on the CPU. This approach relies on incrementally updating states on both CPU and GPU to minimize the data dependencies and communication between the CPU and GPU. Embodiments of the present invention advantageously avoid frequent CPU/GPU synchronization and permits work on CPU and GPU to overlap execution.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 3 shows an exemplary physics rendering process 300 in accordance with one embodiment of the present invention.

DETAILED DESCRIPTION

Figure 1:
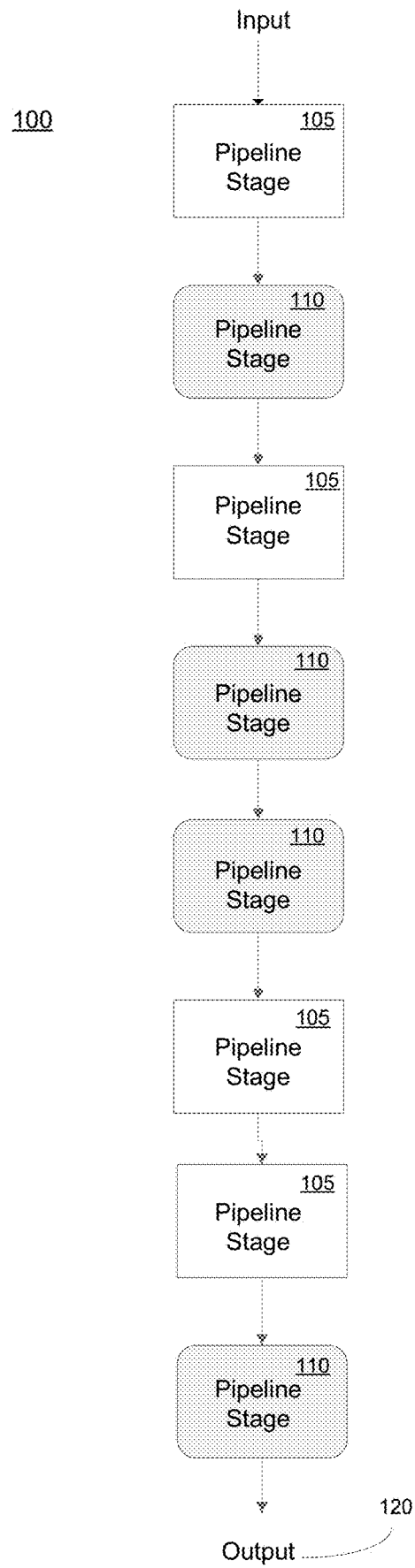
FIG. 1 shows an exemplary physics rendering pipeline 100 in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of non-transitory electrical or magnetic signals capable of being stored, transferred, combined, compared, and otherwise manipulated in a computer readable storage medium of a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 600 of FIG. 6), or similar electronic computing device, that manipulates and transforms data represented as physical (electronic) quantities within the computer system's registers and memories into other data similarly represented as physical quantities within the computer system memories or registers or other such information storage, transmission or display devices.

A Hybrid, Scalable CPU/GPU Rigid Body Pipeline

Embodiments of the present invention comprise a hybrid CPU/GPU rigid body pipeline that executes elements of the rigid body pipeline on CPU and GPU. This approach achieves high-levels of scalability by leveraging the GPU to do the heavy processing and computations of the massively-parallel work while the CPU handles the stages that do not parallelize effectively.

In one embodiment, the present invention is implemented as a method for a hybrid scalable CPU/GPU rigid body pipeline. The method includes partitioning a rigid body pipeline into a GPU portion comprising GPU components and a CPU portion comprising CPU components. The method further includes executing the GPU components on the GPU of a computer system, and executing the CPU components on the CPU of the computer system. Communication of data dependencies between the CPU and the GPU are managed as the GPU components and the CPU components process through the GPU and the CPU. The method concludes by outputting a resulting processed frame for display.

FIG. 1 shows a physics rendering pipeline 100 in accordance with one embodiment of the present invention. As shown in FIG. 1, the pipeline 100 comprises multiple stages with one stage receiving inputs from a previous stage while providing outputs to a subsequent stage. As depicted in FIG. 1, some stages are rectangular with square corners 105 while other stages are rectangular with rounded corners 110. This depiction is to identify which of the stages are suited to massively-parallel work (e.g., the rounded corner stages 110), and which of the stages are suited to single threaded work (e.g., the square corner stages 105). Traditionally, the entirety of the pipeline 100 was executed on either a GPU or a CPU. Embodiments of the present invention implement a hybrid scalable CPU/GPU rigid body pipeline that advantageously executes on both the GPU and CPU. FIG. 1 also shows the pipeline output 120 where, for example, a resulting processed frame is output for display.

Figure 2:
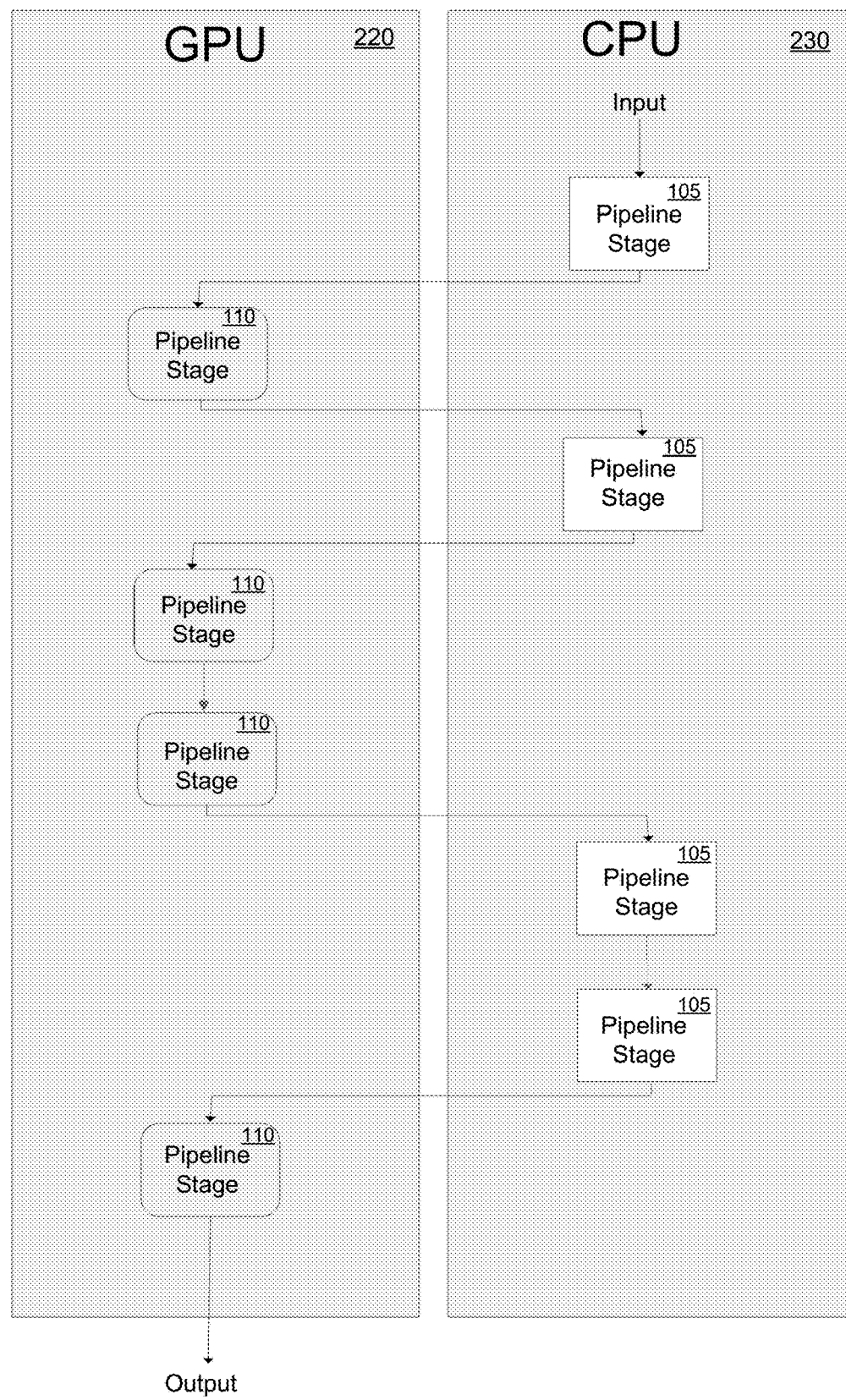
FIG. 2 shows an exemplary physics rendering pipeline 200 in accordance with one embodiment of the present invention.

FIG. 2 shows a physics rendering pipeline 200 in accordance with one embodiment of the present invention where pipe stages are separated depending upon their operation. As shown in FIG. 2, the pipeline 200 comprises multiple stages with one stage receiving inputs from a previous stage while providing outputs to a subsequent stage. However, the FIG. 2 depiction shows how the pipeline stages that are suited to parallelization 110 execute on the GPU on the left-hand side 220 and the pipeline stages that are suited to fast single threaded processing 105 execute on the CPU on the right-hand side 230

Figure 6:
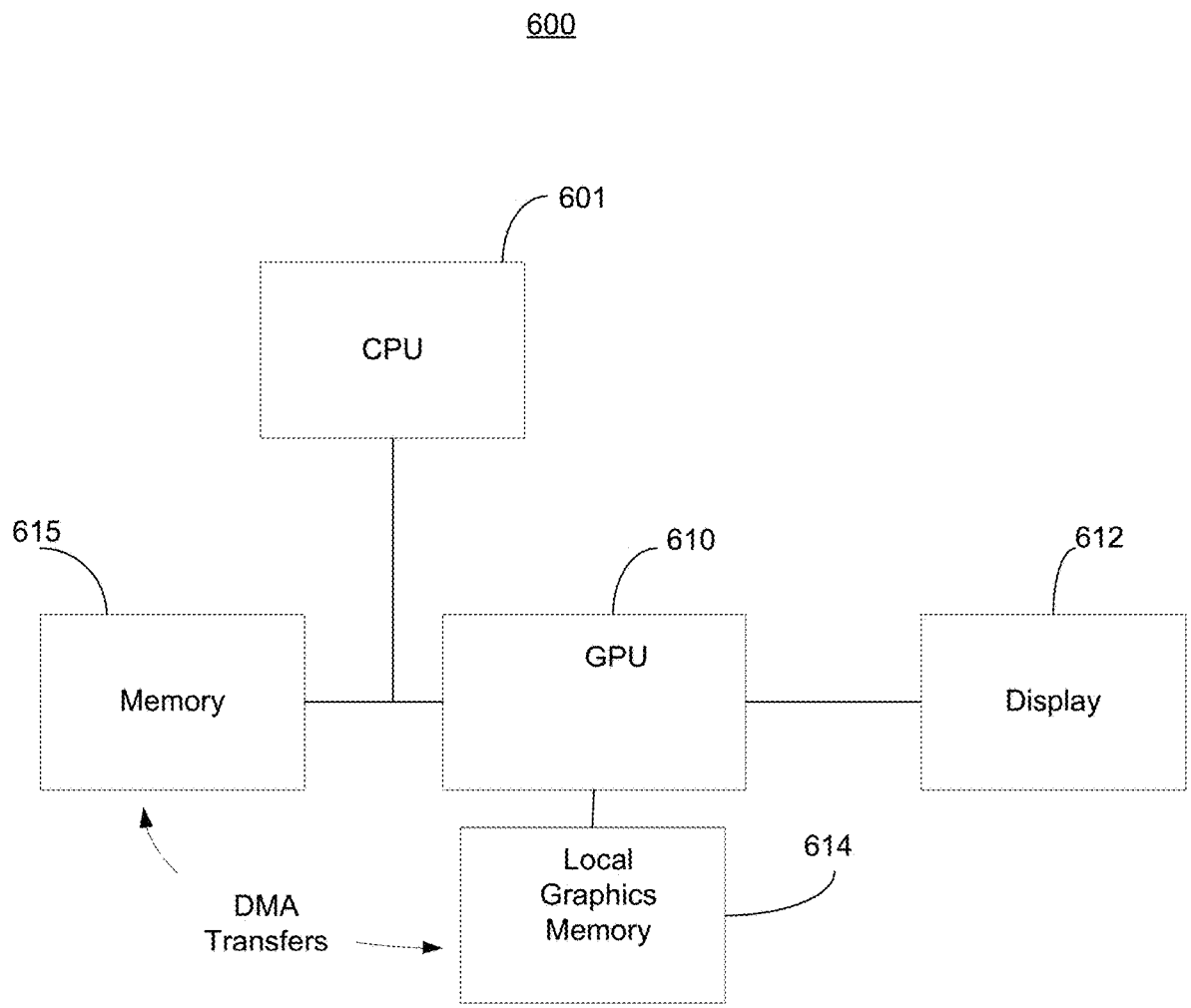
FIG. 6 shows an exemplary computer system 600 in accordance with one embodiment of the present invention.

Therefore, the pipeline 200 of FIG. 2 is implemented within an electronic system having both a GPU in the CPU and the various memory subsystems that typically are required for CPU and GPU operation (e.g., see FIG. 6).

It should be noted that the stages of the pipeline are still connected and information still flows from one stage to another, as shown. In one embodiment, as information passes from a stage executing on the GPU to a stage executing on CPU, that passing 240 is implemented via a DMA transfer. DMA transfers are a method for efficiently transferring data to and from, for example, GPU memory and system memory.

FIG. 3 shows a physics rendering process 300 in accordance with one embodiment of the present invention. As depicted in FIG. 3, process 300 shows exemplary steps as performed by a hybrid CPU/GPU rigid body pipeline in accordance with one embodiment of the present invention.

Process 300 begins in step 301, with the partitioning of a rigid body pipeline into a GPU portion comprising GPU components and the CPU portion comprising CPU components. As referred to herein, components can comprise for example pipeline stages as discussed above respect to FIG. 2. In one embodiment, the components are partitioned at compile time. The components are assessed to determine which of them are suited for parallel execution and which of them are suited for single threaded execution, and a partition is affected. In another embodiment, the components are partitioned at runtime. The assessment and partitioning are implemented dynamically at runtime.

In step 302 of FIG. 3, the GPU components are executed on the GPU of a computer system. In step 303, the CPU components are executed on the CPU of the computer system. In step 304, communication of data dependencies between the CPU and the GPU are managed as the GPU components and the CPU components pass through the GPU and the CPU respectively. In step 305, the resulting processed frame is output for display.

In one embodiment, the rigid body pipeline (e.g., pipeline 200) is a PhyX compatible rigid body pipeline. As described above, PhysX is a scalable multi-platform game physics solution supporting a wide range of devices, from smartphones to high-end multicore CPUs and GPUs. PhysX is already integrated into some of the most popular game engines, including Unreal Engine (versions 3 and 4), Unity3D, and Stingray, for instance.

In one embodiment, incremental state updates are implemented on both the CPU and GPU to minimize the data dependencies and communication between the CPU and GPU.

In one embodiment, the managing of communication dependencies between the CPU and GPU is implemented via DMA transfers. In one embodiment, the CPU is a multiple core CPU and the CPU components execute on each of the multiple cores. The rigid body pipeline can be used to implement, for example, a real-time user interactive physics simulation.

In one embodiment, the partitioning of the rigid body pipeline into the GPU portion comprising GPU components and the CPU portion comprising CPU components is implemented dynamically and in accordance with the capabilities of the CPU and the GPU. For example, if a CPU is particularly powerful, it may be accorded more stages for execution. In those instances where the CPU is not powerful, it may be accorded fewer stages for execution. In this manner, the hybrid pipeline can be implemented dynamically and in accordance with the relative capabilities of the CPU and the GPU.

It should be noted that in one embodiment, the hybrid pipeline is loaded into system memory (e.g., from a non-volatile storage media, typically a hard disk drive) via API calls of the operating system. The GPU portions of the hybrid pipeline are loaded typically via software implemented API calls on the graphics driver. Typically, the graphics driver executes a series of DMA transfers to instantiate the GPU portion of the pipeline.

As described above the GPU portions comprise those stages that are suited to massive parallelization using the hundreds of shaders of the GPU. This software has many instructions and steps that can be paralyzed into many threads and can execute without being dependent upon one another and non-sequentially. The CPU portions comprise those stages that are essentially single threaded in nature where software instructions are dependent upon one another in sequence and the threads typically have a larger number of branches. It is these characteristics which are assessed when laying out the hybrid pipeline for instantiation. As described above, the partitioning of the hybrid pipeline can be implemented at compile time or at runtime.

Figure 4:
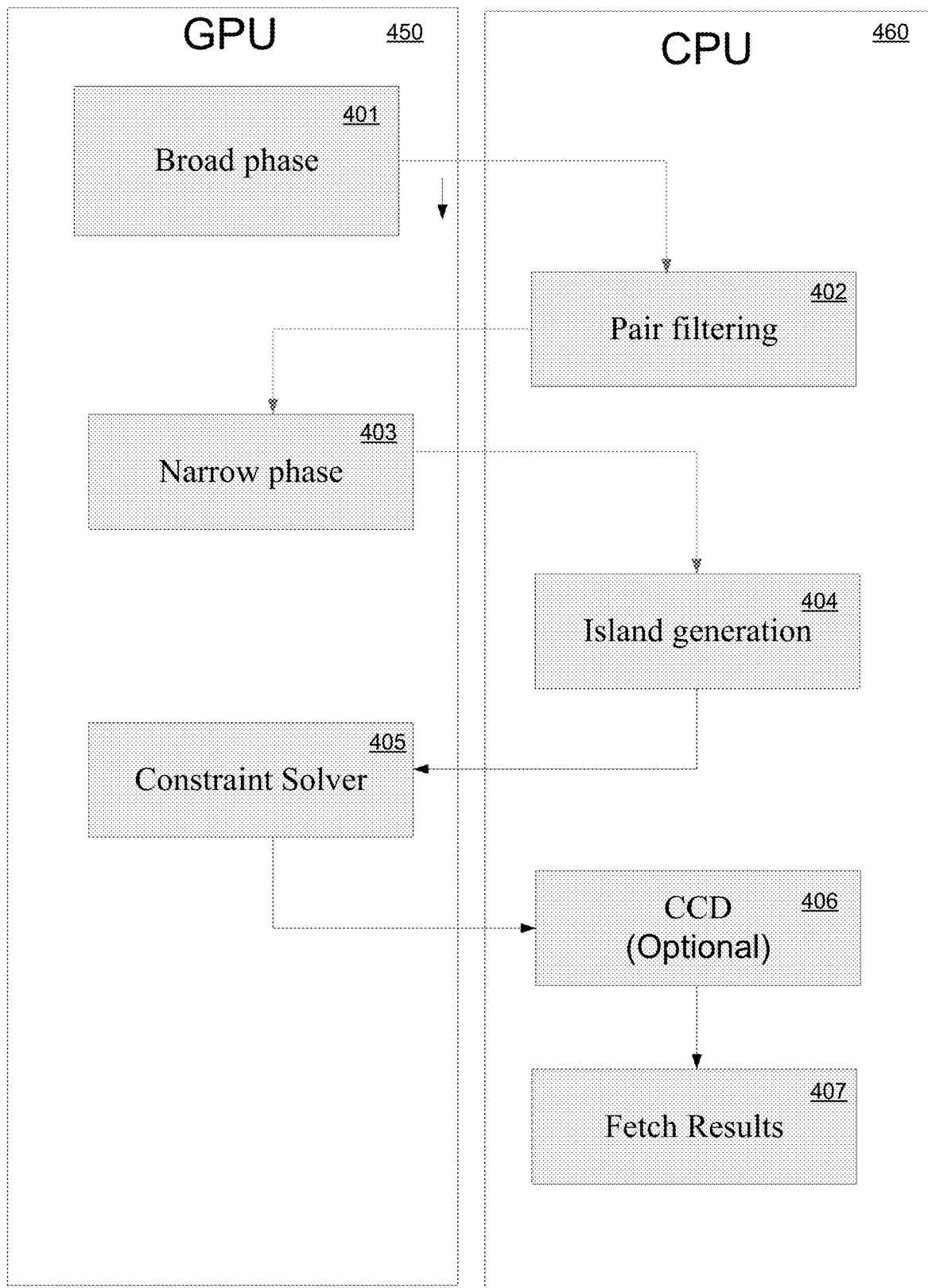
FIG. 4 shows an exemplary physics rendering pipeline 400 in accordance with one embodiment of the present invention.

FIG. 4 shows a physics rendering pipeline 400 in accordance with one embodiment of the present invention. Pipeline 400 shows the hybrid nature of the execution in accordance with embodiments of the present invention. The pipeline begins with stage 401, the broad phase. Broad Phase processing comprises the production of a set of candidate pairs (e.g., rigid bodies) that are potentially interacting. The processing quickly rejects non-overlapping pairs and uses approximate bounds.

The pipeline 400 continues with pair filtering in stage 402. Pair filtering results in the application of rules to permit/disallow pairs to be processed by narrow phase or solver. In stage 403, narrow phase processing is implemented. Narrow phase/contact generation processes the set of pairs produced by broad phase processing and determines if the geometries of the rigid bodies are actually interacting, in which case contacts are generated.

In stage 404, island generation is performed. Island generation groups rigid bodies into islands. An island comprises a collection of rigid bodies interacting via contacts or constraints. A given object can be a member of only 1 island unless that body is static or kinematic. In stage 405, a constraint solver is implemented. The constraint solver functions by solving islands by producing constraints from the set of contacts and joints of the rigid bodies. The constraint solver also computes new velocities and transforms for rigid bodies that satisfy constraints.

In stage 406, continuous collision detection (CCD) is performed, optionally. Collision detection in 3D games detects whether objects are intersecting. Continuous collision detection functions by checking the objects at their current position, then as the game/simulation moves the objects the collision detection checks the objects at their new positions. Continuous collision detection is optimized for processing fast moving objects in order to ensure critical collisions are not missed. In stage 407, the fetch results are processed. This processing includes buffering, the initiation of user callbacks, and the updating of the scene query structures and the output of a processed frame for display.

Thus as shown in FIG. 4, the broad phase stage 401, the narrow phase stage 403, and the constraint solver 405 are partitioned to execute on the GPU 450. The pair filtering stage 402, island generation stage 404, CCD stage 406, and the fetch results stage 407 execute on the CPU 460.

In one embodiment, the present invention implements a broad phase stage 401, wherein a two-phase incremental broad phase algorithm is used. This algorithm produces only delta pairs (e.g., new or lost pairs since the last time broad phase was processed). This attribute significantly reduces the amount of data needed to transfer between the CPU and the GPU. The implementation on the GPU results in high levels of scalability, and is often orders of magnitude faster than commonly used CPU sweep and prune approaches. In one embodiment, the broad phase stage 401 can be enabled without enabling the rest of the pipeline of the GPU 450.

Figure 5:
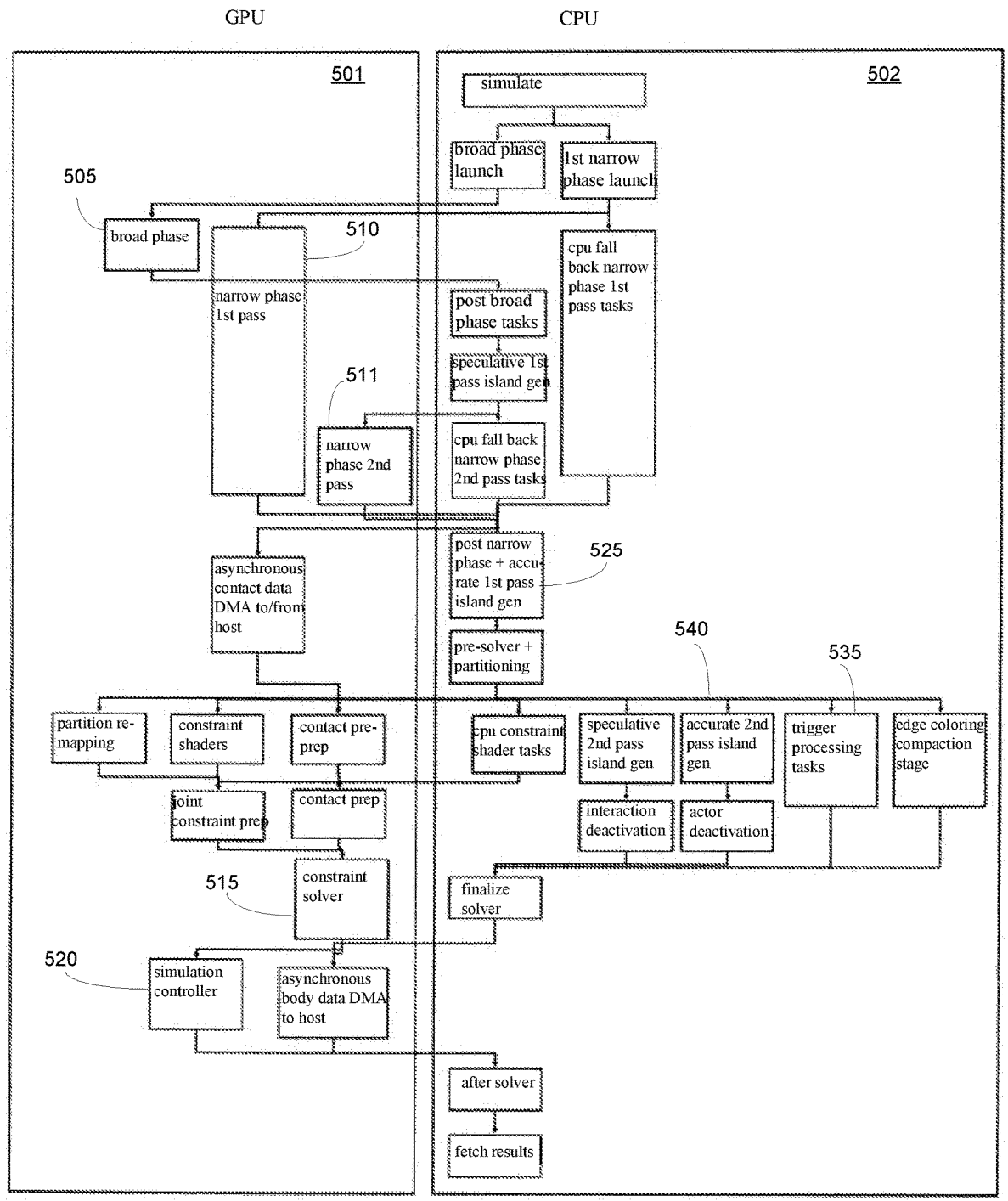
FIG. 5 shows an exemplary computer system 500 in accordance with one embodiment of the present invention.

FIG. 5 shows a physics rendering pipeline 500 in accordance with one embodiment of the present invention. In the same manner as depicted earlier in FIG. 4, stages suited to parallelization are shown on the GPU 501 side of FIG. 5, while stages suited to single threaded processing are shown on the CPU 502 side of FIG. 5. The pipeline 500 is similar to the pipeline 400 except that it shows considerably more complexity and stages. The hybrid GPU/CPU nature of execution is the same however.

In the FIG. 5 embodiment, as shown by pipeline 500, the broad phase 505, narrow phase first pass 510, narrow phase second pass 511, constraint solver and elements of shape and body state management are executed on the GPU, while island generation 525, pair filtering, triggering 535, modifiable contacts, scene query update and event notification are executed on the CPU. The DMA transfers between the GPU 501 and the CPU 502 are represented by the horizontal lines that pass between the GPU 501 and the CPU 502 (e.g., line 540).

Embodiments of the present invention advantageously implement a partitioned PhyX rigid body pipeline. The partitioned pipeline includes a CPU execution portion and a GPU execution portion. Rather than attempting to run the entire pipeline on the CPU, which contains pipeline stages that do not parallelize very effectively, elements (e.g., or portions) of the pipeline are advantageously run on the CPU and GPU. This makes more efficient use of all available resources, and reduces fixed costs associated with launching extremely large numbers of kernels and allows support features that would be extremely difficult to implement efficiently on the GPU.

As described above, elements of the pipeline that are readily parallelized are executed on the GPU. Elements of the pipeline that are naturally single threaded and do not parallelize easily are executed on the CPU. Cross communication (e.g., line 540) is managed by allowing data sharing between the CPU and the GPU as dependent data moves through the pipeline on both the CPU and the GPU (e.g., DMA transfers, etc.).

The DMA communication points are a challenge for performance and scalability because, when data is needed back from the GPU, the CPU is blocked waiting for the GPU to complete all commands up to a given marker that was injected into the GPU's command list. This potentially blocks the CPU while waiting for the GPU to catch up. On the contrary, all communication from CPU to GPU is non-blocking when the CPU has reached its required stage it pushes commands to transfer data and/or execute further compute shaders into the GPU's command queue.

In one embodiment, there are 3 points in the pipeline where syncs between the GPU and CPU occur and the CPU is potentially blocked waiting for the GPU to reach a stage. One point is when the broad phase results are received (e.g., found overlapping pairs, lost overlapping pairs). Another point is when the narrow phase results are received (e.g., the set of pairs that found touch events/lost touch events). And the third point is at the end of the solver, when the final state of the rigid bodies are brought back to the CPU from the GPU. In these 3 cases, the amount of data that's transferred is minimised where possible.

The above mentioned stages of FIG. 5 comprise key stages at which point communication between CPU and GPU occurs. These are important stages from an architectural perspective. Other stages can vary based on an implementation perspective.

The hybrid CPU/GPU pipeline in accordance with embodiments of the present invention effectively decouples dependent computations on the CPU, in part by keeping both the CPU and the GPU busy. This approach relies on incrementally updating states on both CPU and GPU to minimize the data dependencies and communication between the CPU and GPU. It avoids frequent CPU/GPU synchronization and permits work on CPU and GPU to overlap execution.

Experimentation has found this approach to deliver up to and beyond 6× the performance of a high-end multi-core CPU running software PhysX rigid bodies while delivering extremely low total simulation times (e.g. 5-6 ms for 20,000 rigid bodies) and extremely low (sub-1.3 ms) fixed costs. This makes the hybrid pipeline well-suited for use in modern game engines.

Benefits of the embodiments of the invention include providing GPU differentiation for rigid body simulation in modern/next-gen computer games. The performance of the hybrid rigid body pipeline can be used to readily implement a real-time user interactive physics simulation. It could also be used in the fields of robotics, simulations and effects simulation in the film and video industry. Furthermore, it could form the basis of a cloud PhyX platform. This novel architecture not only facilitates GPU acceleration but has a positive effect on performance when simulating exclusively on the CPU using multiple threads (e.g., on a multicore CPU).

Computer System Platform:

FIG. 6 shows a computer system 600 in accordance with one embodiment of the present invention. Computer system 600 depicts the components of a basic computer system in accordance with embodiments of the present invention providing the execution platform for certain hardware-based and software-based functionality. In general, computer system 600 comprises at least one CPU 601, a system memory 615, and at least one graphics processor unit (GPU) 610. The CPU 601 can be coupled to the system memory 615 via a bridge component/memory controller (not shown) or can be directly coupled to the system memory 615 via a memory controller (not shown) internal to the CPU 601. The GPU 610 is coupled to a display 612. The GPU 610 is shown including an allocation/de-allocation component 620 for just-in-time register allocation for a multithreaded processor. A register file 627 and an exemplary one of the plurality of registers (e.g., register 625) comprising the register file is also shown within the GPU 610. One or more additional GPUs can optionally be coupled to system 600 to further increase its computational power. The GPU(s) 610 is coupled to the CPU 601 and the system memory 615.

System 600 can be implemented as, for example, a desktop computer system or server computer system, having a powerful general-purpose CPU 601 coupled to a dedicated graphics rendering GPU 610. In such an embodiment, components can be included that add peripheral buses, specialized graphics memory, IO devices, and the like. Similarly, system 600 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 610 can be implemented as a discrete component, a discrete graphics card designed to couple to the computer system 600 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 614 can be included for the GPU 610 for high bandwidth graphics data storage.

As described above with respect to FIG. 2, FIG. 4, and FIG. 5, the GPU 610 and the CPU 601 can be used to implement the hybrid pipeline of the embodiments of the present invention.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for distribution of tasks within multi-processor rigid body pipelines, the method comprising:
    identifying tasks for an application to be executed on a multi-processor rigid-body pipeline;
    determining a first subset of the tasks for execution by one or more GPUs of the multi-processor rigid body pipeline and a second subset of the tasks for execution by one or more CPUs of the multi-processor rigid body pipeline, the first subset of the tasks including at least one of a narrow phase or a constraint solver and the second subset of the tasks including at least one of island generation, pair filtering, triggering, or modifiable contacts;
    assigning the first subset of the tasks to the one or more CPUs of the multi-processor rigid body pipeline and the second subset of the tasks to the one or more GPUs of the multi-processor rigid body pipeline;
    executing the application using the multi-processor rigid body pipeline according to the assigning of the first subset of the tasks and the second subset of the tasks; and
    outputting, after execution of each of the tasks, a processed frame for display.

2. The method of claim 1, wherein the multi-processor rigid body pipeline is a PhysX compatible.

3. The method of claim 1, wherein incremental state updates are shared between the one or more CPUs and the one or more GPUs during the executing the application.

4. The method of claim 1, further comprising managing communication of data dependencies between the one or more CPUs and the one or more GPUs concurrent with the executing the application, the managing of the communication dependencies being executed via one or more DMA transfers.

5. The method of claim 1, wherein at least one CPU of the one or more CPUs comprises a CPU with multiple cores, and further wherein the first subset of the tasks execute on each of the multiple cores.

6. The method of claim 1, wherein the first subset of the tasks further includes a broad phase, and the broad phase is executed using the one or more GPUs using a first broad phase and a second broad phase such that an output of the broad phase includes delta pairs corresponding to at least one of new pairs or lost pairs with respect to at least one prior iteration of the broad phase.

7. The method of claim 1, wherein the first subset of the tasks includes the narrow phase, and the narrow phase is executed using the one or more GPUs in a first narrow phase pass and a second narrow phase pass.

8. A non-transitory computer readable media comprising instructions for implementing a rigid body pipeline, which instructions when executed by a computer system causes the computer system to implement a method comprising:
    identifying tasks for an application to be executed using the rigid-body pipeline;
    partitioning the rigid body pipeline into a GPU-executable portion comprising a first subset of the tasks to be executed using one or more GPUs and a CPU-executable portion comprising a second subset of the tasks to be executed using one or more CPUs, the first subset of the tasks including at least one of a narrow phase or a constraint solver and the second subset of the tasks including at least one of island generation, pair filtering, triggering, or modifiable contacts;
    executing the application using the rigid body pipeline according to the partitioning; and
    outputting, after execution of each of the tasks, a processed frame for display.

9. The computer readable media of claim 8, wherein the rigid body pipeline is PhysX compatible.

10. The computer readable media of claim 8, wherein incremental state updates are shared between the one or more CPUs and the one or more GPUs during the executing the application.

11. The computer readable media of claim 8, further comprising managing communication of data dependencies between the one or more CPUs and the one or more GPUs concurrent with the executing the application, the managing of the communication dependencies being executed via one or more DMA transfers.

12. The computer readable media of claim 8, wherein at least one CPU of the one or more CPUs comprises a CPU with multiple cores, and further wherein the first subset of the tasks execute on each of the multiple cores.

13. The computer readable media of claim 8, wherein the first subset of the tasks further includes a broad phase, and the broad phase is executed using the one or more GPUs using a first broad phase and a second broad phase such that an output of the broad phase includes delta pairs corresponding to at least one of new pairs or lost pairs with respect to at least one prior iteration of the broad phase.

14. The computer readable media of claim 8, wherein the first subset of the tasks includes the narrow phase, and the narrow phase is executed using the one or more GPUs in a first narrow phase pass and a second narrow phase pass.

15. A system, comprising:
    a computer system having at least one CPU and at least one GPU coupled to a computer readable storage media and executing computer readable code which causes the computer system to implement a method for a rigid body pipeline, the method comprising:
        partitioning the rigid body pipeline into a GPU-executable portion comprising a first subset of the tasks to be executed using one or more GPUs and a CPU-executable portion comprising a second subset of the tasks to be executed using one or more CPUs, the first subset of the tasks including at least one of a narrow phase or a constraint solver and the second subset of the tasks including at least one of island generation, pair filtering, triggering, or modifiable contacts;
        executing the application using the rigid body pipeline according to the partitioning; and
        outputting, after execution of each of the tasks, a processed frame for display.

16. The system of claim 15, wherein the rigid body pipeline is PhysX compatible.

17. The system of claim 15, wherein the first subset of the tasks includes the constraint solver and the second subset of the tasks includes the island generation, and further wherein outputs of the island generation are processed by the constraint solver.

18. The system of claim 15, wherein at least one first task of the first subset of the tasks is executed in parallel with at least one second task of the second subset of the tasks, and a communication of dependencies between the at least one first task and the at least one second task are via one or more DMA transfers.

19. The system of claim 15, wherein the partitioning is based at least in part on an amount of sequential dependency between software threads of each task of the tasks.

20. The system of claim 15, wherein the partitioning is executed dynamically, at runtime, and in accordance with determined capabilities of the one or more CPUs and the one or more GPUs.

* * * * *